United States Patent [19]
Takihiro et al.

[11] Patent Number: 5,777,994
[45] Date of Patent: Jul. 7, 1998

[54] ATM SWITCH AND INTERMEDIATE SYSTEM

[75] Inventors: Masatoshi Takihiro; Toshihiko Murakami; Hidehiro Fukushima, all of Fujisawa; Osamu Takada, Sagamihara; Atsushi Kimoto, Hadano, all of Japan

[73] Assignee: Hitachi, Ltd., Tokyo, Japan

[21] Appl. No.: 601,354

[22] Filed: Feb. 16, 1996

[30] Foreign Application Priority Data

Feb. 17, 1995 [JP] Japan ................................... 7-053289

[51] Int. Cl.⁶ ............................................. H04L 12/56
[52] U.S. Cl. ................................... 370/395; 370/401
[58] Field of Search ................................ 370/352, 353, 370/354, 356, 355, 389, 394, 395, 396, 402, 428, 392, 397, 400, 401, 403, 404, 408, 320, 411

[56] References Cited

U.S. PATENT DOCUMENTS

| | | | |
|---|---|---|---|
| 5,379,297 | 1/1995 | Glover et al. | 370/355 |
| 5,408,469 | 4/1995 | Opher et al. | 370/474 |
| 5,450,411 | 9/1995 | Heil | 370/419 |

*Primary Examiner*—Dang Ton
*Attorney, Agent, or Firm*—Antonelli, Terry, Stout, & Kraus, LLP

[57] ABSTRACT

An ATM switch for providing an electrical interconnection between a connection-oriented ATM LAN of an ATM system and a connectionless legacy LAN is provided. The ATM switch includes a switch fabric electrically connected to the ATM LAN, a segmentation and reassembly block electrically connected to the switch fabric, for providing an interchange between one of cells transmitted over the ATM LAN and a packet transmitted over the legacy LAN, a management and control block electrically connected to the switch fabric through the segmentation and control block so as to manage and control operations for electrical connections between networks, a first bridging/routing processor having a legacy LAN interface for providing electrical connections between the legacy LAN and the first bridging/routing processor, a second bridging/routing processor electrically connected to the switch fabric through at least one ATM interface, and a bus for providing electrical connections between the management and control block, the first bridging/routing processor and the second bridging/routing processor. A LAN emulation configuration server function for managing configurations of a plurality of virtual LAN segments on the ATM LAN, which are required upon LAN emulation, a LAN emulation server function for obtaining an address resolution to an ATM address from a media access address, and a broadcast and unknown server function for making a broadcast to a terminal in the LAN are provided so as to be distributed to the management and control block or the second bridging/routing processor.

11 Claims, 9 Drawing Sheets

| RECEIVED VIRTUAL CHANNEL IDENTIFIER (vpi/vci) | DISTINCTION DESTINATION |
|---|---|
| 0/5 | SIGNALING CONTROL |
| a/b ⋮ | LECS |
| c/d ⋮ | LES |

| RECEIVED VIRTUAL CHANNEL IDENTIFIER (vpi/vci) | DISTINCTION DESTINATION |
|---|---|
| 0/5 | SIGNALING CONTROL |
| a/b ⋮ | LEC |
| c/d ⋮ | BUS |

| RECEIVED VIRTUAL CHANNEL IDENTIFIER (vpi/vci) | DISTINCTION DESTINATION |
|---|---|
| 0/5 | SIGNALING CONTROL |
| a/b ⋮ | LEC |
| c/d ⋮ | BUS |
| e/f ⋮ | ROUTING PROCESS |

ATM SWITCH AND INTERMEDIATE SYSTEM

BACKGROUND OF THE INVENTION

The present invention relates to an ATM switch for providing an interconnection between an ATM LAN and a legacy LAN based on a bridging/routing function and having a LAN emulation function for holding an application operated on the legacy LAN on the ATM LAN and to an intermediate system using the ATM switch.

The term ATM (Asynchronous Transfer Mode) is the technology of dividing information that one desires to transfer into fixed-length blocks, adding headers indicative of transfer destinations to the divided blocks so as to be formed as fixed-length cells and transferring information to the transfer destinations with the cells as units. According to the technology, since the cells are fixed in length, the headers indicative of the transfer destinations can be identified and replaced with others at high speed by hardware. Further, the present technology has an advantage that a change in the number of cells transmitted during a fixed time allows for a desired communication or transmission speed. An ATM LAN shows a LAN (Local Area Network) using such an ATM system. The ATM is of a system or mode for basically establishing a connection on an end-to-end basis upon setting a call or signaling, and releasing the established connection upon completion of the call.

A legacy LAN such as an Ethernet (product name of CSMA/CD type LAN), a token bus or the like has heretofore been widely used. Various applications activated on the legacy LAN have been proposed and operated. The legacy LAN is of a so-called connectionless network wherein a connection between terminals or end systems is basically not established prior to the transfer of data.

LAN emulation is the technology of proposing two main purposes: providing an interconnection between the aforementioned ATM LAN (connection) and legacy LAN (connectionless) and holding an application operated on the legacy LAN on the ATM LAN. The LAN emulation has been standardized as LAN emulation over ATM: Draft Specification by an ATM Forum Technical Committee LAN emulation Sub-working Group.

Achieving the LAN emulation function first needs to implement a LAN emulation service function composed of functional components indicated by the following items (1) through (4):

(1) A LECS (LAN Emulation Configuration Server) function for managing configurations of a plurality of virtual LAN segments on an ATM LAN called an Emulated LAN (hereinafter called "ELAN");

(2) A LES (LAN Emulation Server) function for mainly providing an address resolution from a MAC (Medium Access Control) address to an ATM address;

(3) A BUS (Broadcast and Unknown Server) function for making a broadcast to a terminal or end system in the LAN; and (4) A LEC (LAN Emulation Client) function for providing a Logical Link Control layer with a legacy standard Medium Access Control layer interface such as an NDIS (Network Driver Interface Specification), an ODI (Open Data-Link Interface) or the like on an end system, using the LAN emulation service function composed of these functional components such as the LECS function.

Further, a LEC function is provided on the ATM interface side of a bridge function or device in addition to the above functions. A bridge for providing an interconnection between the ATM LAN and the legacy LAN is also required.

Figure 11:
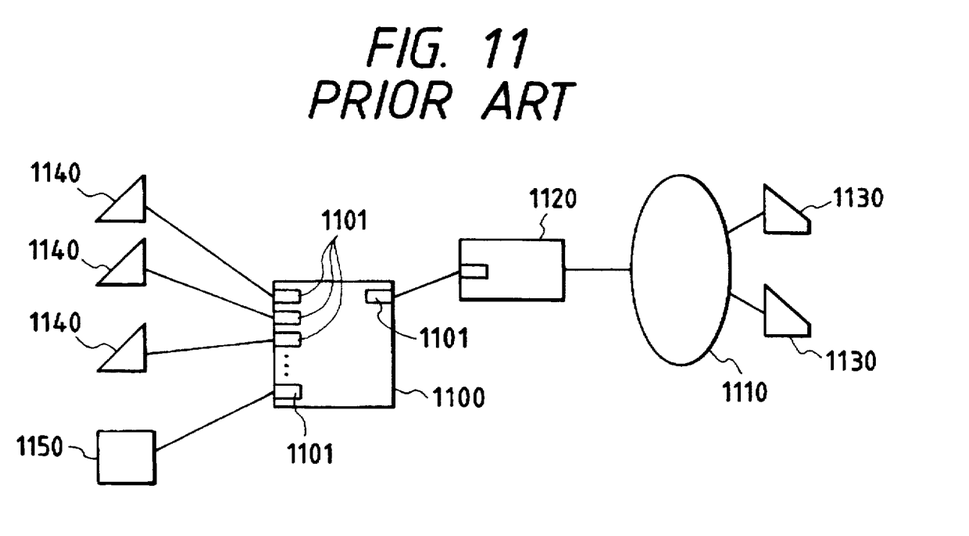
FIG. 11 is a configuration view of a network for performing LAN emulation by a prior art.

In order to implement the LAN emulation, the LAN emulation service function composed of the LECS function, LEC function and BUS function must be mounted within network equipment such as an ATM switch, or an end system. These functions are normally achieved as a server mounted on an end system. FIG. 11 is a configurational view showing, in simplified form, one example of an ATM LAN for performing LAN emulation by the known technology. A server 1150 is connected to one ATM interface 1101 of an ATM switch 1100. The aforementioned LAN emulation service function is implemented by the server 1150. A legacy LAN 1110 is connected to the ATM switch 1100 through a bridge 1120. Designated at numerals 1140 in FIG. 11 are ATM LAN end systems electrically connected to the ATM switch 1100. Designated at numerals 1130 are terminals or end systems electrically connected to the legacy LAN 1110.

A LAN emulation service function is expected to be mounted within network equipment such as an ATM switch as one of network services. However, a problem arises that the network equipment will be degraded in original performance owing to the mounting of the LAN emulation service function in the network equipment.

SUMMARY OF THE INVENTION

An object of the present invention is to mount a LAN emulation service function required upon implementation of LAN emulation inside an ATM switch while suppressing an influence exerted on functions of the ATM switch, such as a signaling function as low as possible.

Another object of the present invention is to provide an ATM switch having a LAN emulation function for achieving LAN emulation by providing a function for bridging and routing between an ATM LAN and a legacy LAN.

In one preferred aspect, an ATM switch according to the present invention provides an interconnection between a connection-oriented ATM LAN of an ATM system and a connectionless legacy LAN. The ATM switch comprises a management and control block for managing and controlling operations for electrical connections between networks, a segmentation and reassembly block for providing an interchange between each cell transmitted over the ATM LAN and a packet transmitted over the legacy LAN, an ATM switch or switch fabric, a legacy LAN interface with bridging/routing processor for providing an electrical connection to the legacy LAN, an ATM interface with bridging/routing processor for providing an electrical connection to the ATM LAN and at least one ATM interface. The management and control block, the legacy LAN interface with bridging/routing processor and the ATM interface with bridging/routing processor are electrically connected to one another via a bus. An external interface of the legacy LAN interface with bridging/routing processor is electrically connected to the legacy LAN. The management and control block and one port of the switch fabric are electrically connected to each other through the segmentation and reassembly block interposed therebetween. Further, an external interface of the ATM interface with bridging/routing processor and one port of the switch fabric are electrically connected to each other through the ATM interface. Ports other than the above ports of the switch fabric are connected to the ATM LAN through the ATM interface.

The management and control block has a signaling function and a bridging/routing management function. Further, the ATM interface with bridging/routing processor has a bridging function (or a bridging/routing function including a routing function as well as a bridging function), a signaling function and a LAN emulation client function.

In order to suppress performance degradation of network equipment, the aforementioned LAN emulation service functional components, i.e., the LECS function, LEC function and BUS function can be disposed in either of the management and control block and the ATM interface with bridging/routing processor.

A packet destined for the signaling function or a packet destined for a desired LAN emulation service function arrives at a portion where the management and control block is connected to the switch fabric through the segmentation and reassembly block interposed therebetween. Therefore, a packet distinction function for distributing an input packet to a suitable function is provided at the portion where the management and control block is connected to the switch fabric through the segmentation and reassembly block. Further, packets destined for the signaling function, bridging/routing function, LAN emulation client function and desired LAN emulation service function are delivered to the ATM interface with bridging/routing processor from the switch fabric through the ATM interface. Therefore, a packet distinction portion for distributing an input packet to a suitable function is provided.

Further, an intermediate system according to the present invention comprises a switch fabric electrically connected to an ATM LAN indicative of a connection-oriented network through at least one ATM interface, a management and control block electrically connected to one port of the switch fabric through a segmentation and reassembly block, a first bridging processor electrically connected to the management and control block through a bus line and having an external interface to which a legacy LAN indicative of a connectionless network is connected, and a second bridging processor electrically connected to the management and control block through the bus line and having an external interface electrically connected to one port of the switch fabric through the segmentation and reassembly block.

According to the present invention, since a LAN emulation service and a process for bridging/routing between an ATM LAN and a legacy LAN are carried out within an ATM switch, LAN emulation can be achieved by mounting only a LEC function to an ATM LAN end system other than network equipment.

A LECS function, a LES function and a BUS function mounted within the ATM switch can be provided in either of a management and control block and an ATM interface with bridging/routing processor. It is thus possible to mount a LAN emulation service function that suppresses performance degradation of the ATM switch. Load distribution can be made by placing the LECS function and the LES function in the management and control block and placing the BUS function in the ATM interface with bridging/routing processor. If allowance is given to the capacity of the ATM interface with bridging/routing processor, then the LECS function may be placed in the management and control block and both the LES function and the BUS function may be placed in the ATM interface with bridging/routing processor.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will be described with reference to the accompanying drawings wherein.

DESCRIPTION OF THE PREFERRED EMBODIMENTS

Figure 1:
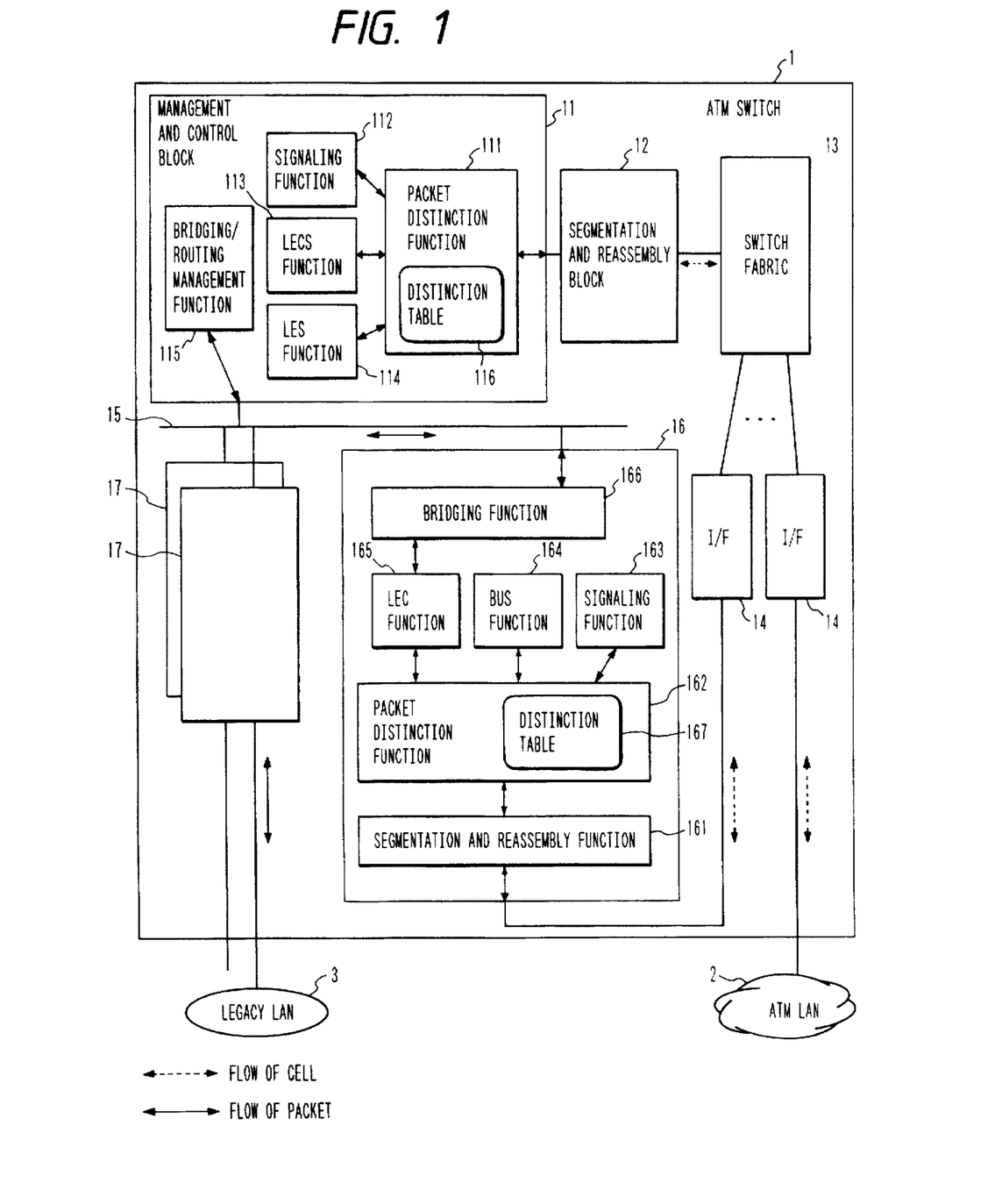
FIG. 1 is a function configurational view of an ATM switch having a LAN emulation function, according to a first embodiment of the present invention.

FIG. 1 is a function configurational view of an ATM switch having a LAN emulation function, according to a first embodiment of the present invention.

The ATM switch 1 having the LAN emulation function comprises a management and control block 11, a cell/packet switcher or segmentation and reassembly block 12, an ATM switch or switch fabric 13, an ATM interface 14, a bus 15, an ATM interface with bridging/routing processing function 16, and a legacy LAN interface with bridging/routing processing function 17. The management and control block 11 is electrically connected to one port of the switch fabric 13 through the segmentation and reassembly block 12 interposed therebetween. Further, the management and control block 11 is also electrically connected to the ATM interface with bridging/routing processing function 16 and the legacy LAN interface with bridging/routing processing function 17 through the bus 15. The ATM interface with bridging/routing processing function 16 and the legacy LAN interface with bridging/routing processing function 17 can be both provided in plural form. Further, one port of the switch fabric 13 is electrically connected to an ATM interface of the ATM interface with bridging/routing processing function 16 through the ATM interface 14. The arrows shown by broken lines in the drawing indicate flows of cells and the arrows shown by solid lines in the drawing indicate flows of packets.

The management and control block 11 includes a signaling function 112, a LECS function 113, a LES function 114, a packet distinction function 111 and a bridging/routing management function 115. The packet distinction function 111 distributes packets delivered from the switch fabric 13 through the segmentation and reassembly block 12, to suitable functions respectively.

Figure 2:
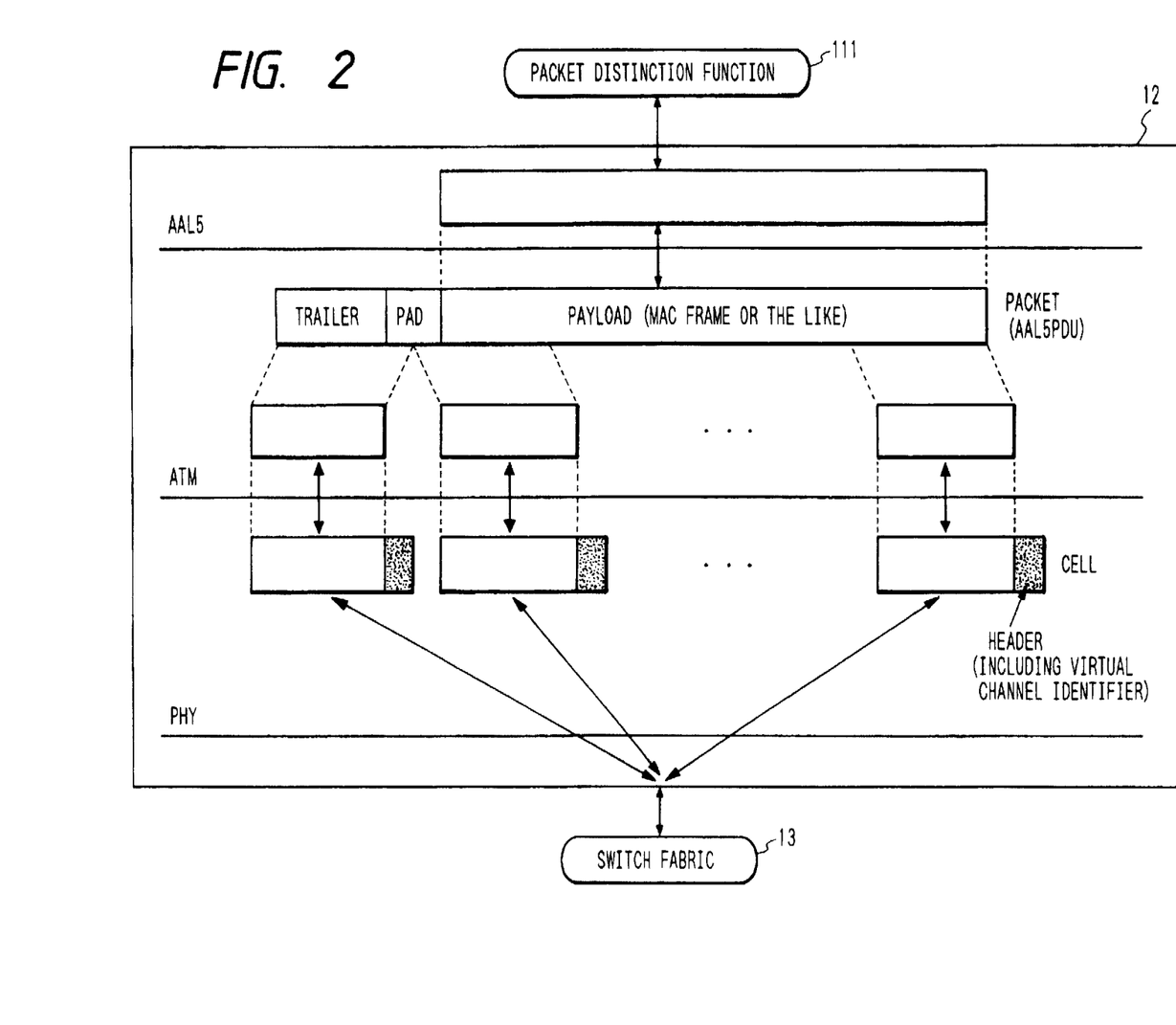
FIG. 2 is an explanatory view for describing a segmentation and reassembly system based on a segmentation and reassembly function.

FIG. 2 shows a segmentation and reassembly system employed in the segmentation and reassembly block 12. As shown in the drawing, the segmentation and reassembly block 12 is composed of a physical layer (PHY), an ATM layer (ATM) and an ATM adaptation layer 5 (AAL5). The segmentation and reassembly block 12 assembles cells supplied from the switch fabric 13 into a packet (AAL5 Protocol Data Unit) and delivers the packet to the packet distinction function 111 together with arrival identifiers for virtual channels of the cells. Further, the segmentation and reassembly block 12 divides a packet delivered from the packet distinction function 111 into cells and transmits each of the cells to its designated virtual channel. The term virtual channel show a virtual transmission path established through the switch fabric 13 in an ATM network.

Figure 3:
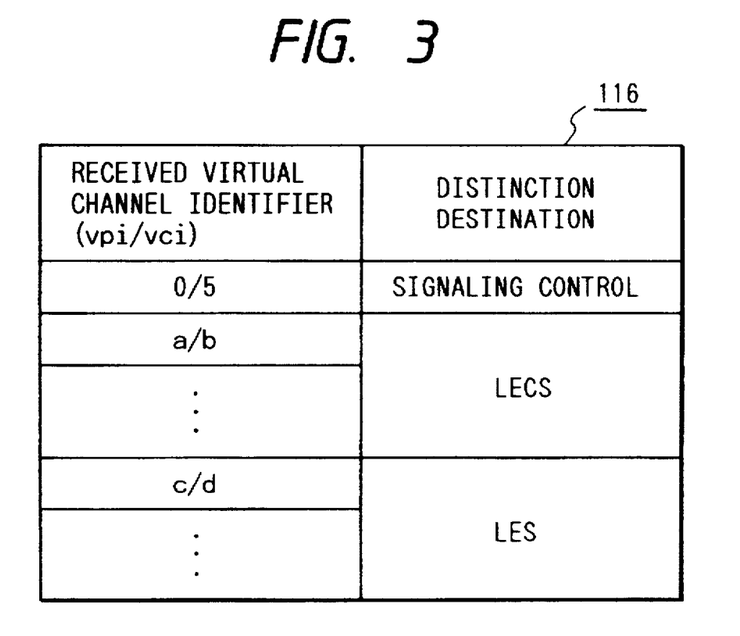
FIG. 3 is a format view showing the format of a distinction table.

The packet distinction function 111 distributes the packet received from the segmentation and reassembly block 12 to each of the suitable functions such as the signaling function 112, the LECS function 113, the LES function 114 based on the virtual channel identifier for the virtual channel, which has received the packet, using a distinction table 116. FIG. 3 shows a format of the distinction table 116 included in the packet distinction function 111. Functions of destinations to each of which the packet is to be distributed, are set to the distinction table 116 so as to correspond to the virtual channel identifiers each of which receives the packet. A virtual channel identifier whose destination is a signaling function, is defined in the distinction table 116 by the ATM network and vpi (Virtual Path Identifier)/vci (Virtual Channel Identifier)=0/5 is used as the value of the identifier.

The signaling function 112 has the function of registering and deleting virtual channel identifiers and packet-distributed destinations or distinction destinations, which is other than the signaling function of the distinction table 116 as well as the normal signaling function defined by the ATM network. A procedure for registering and deleting the virtual channel identifiers and the distinction destinations is as follows. The signaling function 112 analyzes a signaling packet received from the segmentation and reassembly block 12. If the signaling packet is one that requires the establishment of a virtual channel relative to the LECS function 113 or the LES function 114 in accordance with the procedures defined by the ATM network and ATM Forum, then the signaling function 112 establishes a virtual channel in accordance with the procedure defined by the ATM network. Further, the signaling function 112 notifies the establishment of the virtual channel to either the LECS function 113 or the LES function 114. Furthermore, the signaling function 112 sets a virtual channel identifier for the established virtual channel and its distinction destination to the distinction table 116. If the signaling function 112 judges the received signaling packet as one that requires the release of the virtual channel, then the signaling function 112 releases the virtual channel in accordance with the procedure defined by the ATM network and notifies its release to the LECS function 113 and the LES function 114, followed by deletion of its corresponding entry in the distinction table 116. If the received signaling packet is judged as one that requires the establishment of a virtual channel relative to one other than the LECS function 113 or the LES function 114, then the signaling function 112 continues the establishment of a virtual channel for its destination in accordance with the procedure defined by the ATM network. On the other hand, if the signaling packet is judged as one that requires the release of a virtual channel, then the signaling function 112 continues the release of the virtual channel in accordance with the procedure defined by the ATM network. The LECS function 113 and the LES function 114 respectively perform corresponding processes pursuant to the procedure defined by the ATM Forum on the notification of the virtual channel establishment/release received from the signaling function 112 and the packet received through the packet distinction function 111. Upon transmission of a packet from each of the signaling function 112, the LECS function 113 and the LES function 114, the packet distinction function 111 simply delivers the corresponding packet to the segmentation and reassembly block 12 together with the designated virtual channel identifier.

Figure 4:
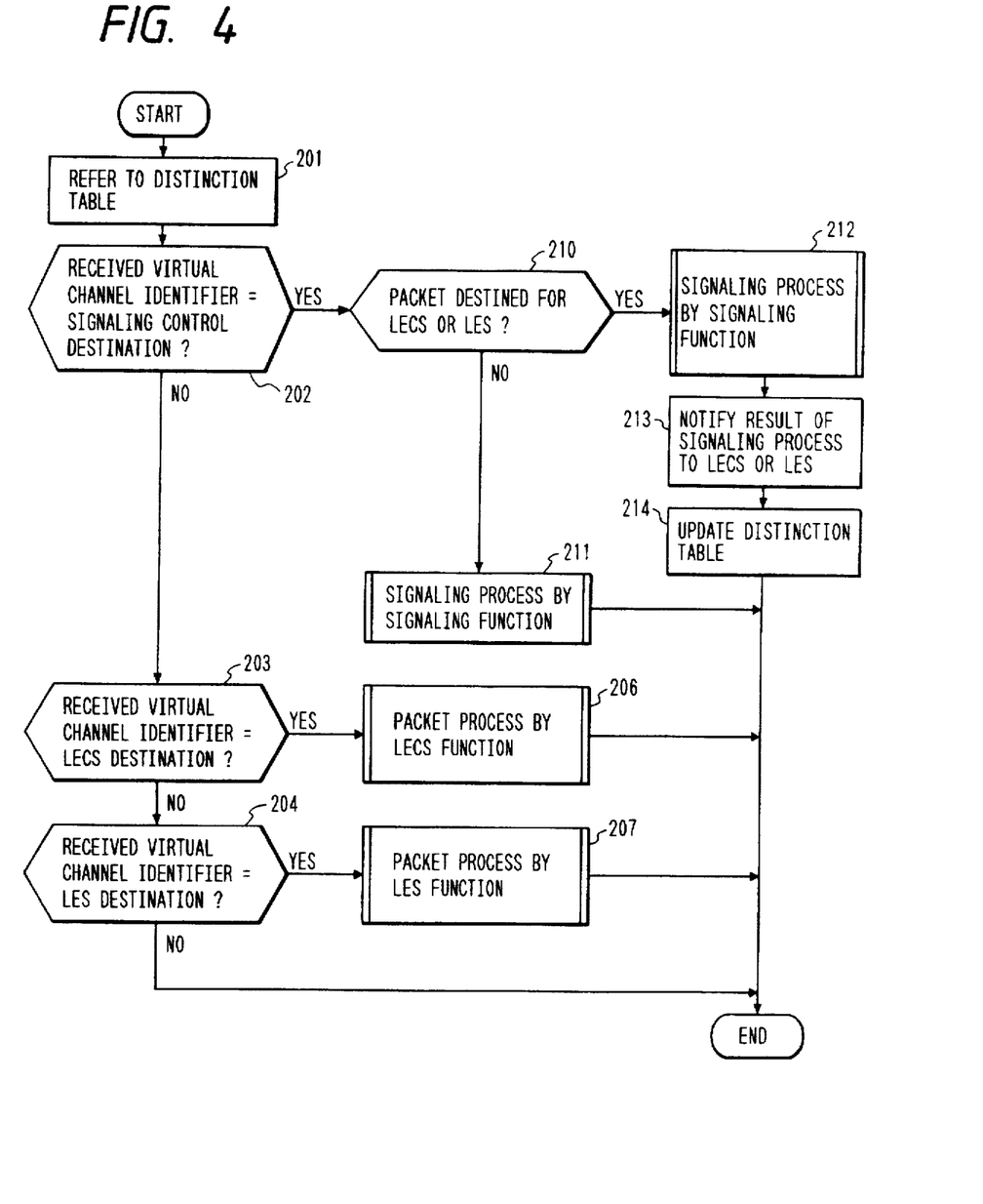
FIG. 4 is a flowchart for centrally describing a process of a packet distinction portion at the time of receipt of a packet.

FIG. 4 is a flowchart for describing the principal operation of the packet distinction function 111 at the time that the packet distinction function 111 has received the corresponding packet from the segmentation and reassembly block 12.

When the packet distinction function 111 receives a packet from the segmentation and reassembly block 12, the packet distinction function 111 refers to the distinction table 116 and makes a decision as to a distinction destination based on a virtual channel identifier notified together with the packet (Step 201). Thereafter, the packet distinction function 111 delivers the corresponding packet to each of the suitable functions, based on the decision (Steps 202, 203 and 204). When the packet distinction destination is judged as being the signaling function 112 from the virtual channel identifier for the received packet, the packet distinction function 111 first delivers the packet to the signaling function 112 (Step 202). The signaling function 112 supplied with the packet analyzes the packet (Step 210). If the packet is judged as one that requires the establishment or release of a virtual channel destined for the LECS function 113 or the LES function 114, then the signaling function 112 performs a signaling process corresponding to its request (Step 212). Thereafter, the signaling function 112 notifies it to either the LECS function 113 or the LES function 114 (Step 213) and registers or deletes a virtual channel identifier and a distinction destination into and from the distinction table 116 as needed (Step 214). If the packet is judged at Step 210 as one that requires the establishment or release of a virtual channel for one other than the LECS function 113 and the LES function 114, then the signaling function 112 performs its corresponding signaling process (Step 211). On the other hand, when the packet distinction destination is found not to be the signaling function 112 from the virtual channel identifier of the packet received at Step 202, the packet distinction function 111 determines or judges at Step 203 whether the packet distinction destination corresponds to the LECS function. If the answer is found to be YES at Step 203, then the packet distinction function 111 delivers the packet to the LECS function 113. The LECS function 113 supplied with the packet performs a packet process in accordance with the procedure defined by the ATM Forum (Step 206). When the distinction destination for the packet received at Step 203 is found not to be destined for the LECS function, the packet distinction function 111 judges at Step 204 whether the distinction destination corresponds to the LES function. If the packet distinction destination is found to be the LES function at Step 204, then the packet distinction function 111 delivers the packet to the LES function 114. The LES function 114 to which the packet has been delivered, performs a packet process in accordance with the procedure defined by the ATM Forum (Step 207).

Referring again to FIG. 1, the structure of the ATM switch according to the present embodiment will be described. The bridging/routing management function 115 creates a bridging/routing table based on information about the configurations of the ATM LAN 2 and the legacy LAN 3 and distributes it to each of the bridging/routing processing functions 16 and 17 each having various interfaces through the bus 15.

Figure 5:
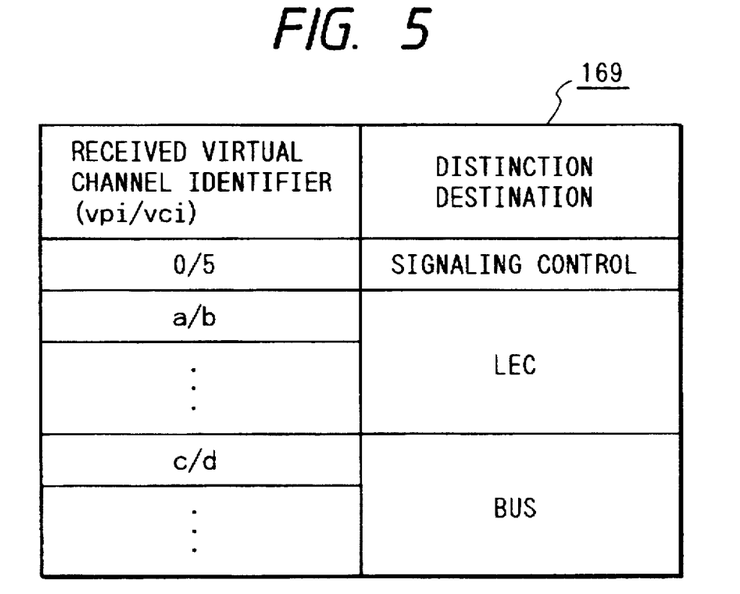
FIG. 5 is a format view illustrating the format of a distinction table.

The ATM interface with bridging/routing processing function 16 has a bridging function 166, a LEC function 165, a BUS function 164, a signaling function 163, a packet distinction function 162 and a segmentation and reassembly function 161. The packet distinction function 162 distributes packets delivered from the switch fabric 13 through the ATM interface 14 and the segmentation and reassembly function 161 to their corresponding suitable functions. The segmentation and reassembly function 161 is composed of a physical layer, an ATM layer and an AAL5 layer and has the same function as that of the segmentation and reassembly block 12. The segmentation and reassembly function 161 reconstructs or reassembles cells supplied from the switch fabric 13 through the ATM interface 14 into a packet and delivers the packet to the packet distinction function 162 together with arrival virtual channel identifiers for the cells. Further, the segmentation and reassembly function 161 divides a packet delivered from the packet distinction function 162 into cells and transmits each of the cells to its designated virtual channel. The packet distinction function 162 distributes the packet received from the segmentation and reassembly function 161 to each of suitable functions such as the LEC function 165, the BUS function 164 or the signaling function 163 based on the virtual channel identifier, using a distinction table 167. FIG. 5 shows a format of the distinction table 167 included in the packet distinction function 162. Virtual channel identifiers and packet distinction destinations based on their corresponding virtual channels are registered into the distinction table 167. A virtual channel identifier whose distinction destination is brought into a signaling function, is defined in the distinction table 167 by the ATM network and makes use of vpi/vci= 0/5.

The signaling function 163 has the function of registering and deleting virtual channel identifiers and packet-distributed destinations or distinction destinations, which is other than the signaling function of the distinction table 167 as well as the normal signaling function defined by the ATM network. A procedure for registering and deleting the virtual channel identifiers and the distinction destinations will be described as follows.

The signaling function 163 analyzes a signaling packet received from the segmentation and reassembly function 161. If the signaling packet is judged as one that requires the establishment of a virtual channel for the LEC function 165 or the BUS function 164 in accordance with the procedures defined by the ATM network and ATM Forum, then the signaling function 163 establishes the virtual channel in accordance with the procedure defined by the ATM network. Further, the signaling function 163 notifies the establishment of the virtual channel to either the LEC function 165 or the BUS function 164. Furthermore, the signaling function 163 sets a virtual channel identifier for the established virtual channel and its distinction destination to the distinction table 167. If the signaling function 163 judges the received signaling packet as one that requires the release of a virtual channel, then the signaling function 163 releases the virtual channel in accordance with the procedure defined by the ATM network and deletes its corresponding entry in the distinction table 167.

The LEC function 165 and the BUS function 164 respectively process the notification of the establishment/release of the virtual channel, which has been received from the signaling function 163, and the packet received through the packet distinction function 162 in accordance with the procedure defined by the ATM Forum.

Upon transmission of a packet from the signaling function 163, the BUS function 164 or the LEC function 165, the packet distinction function 162 simply delivers the corresponding packet to the segmentation and reassembly block together with the designated virtual channel identifier.

Figure 6:
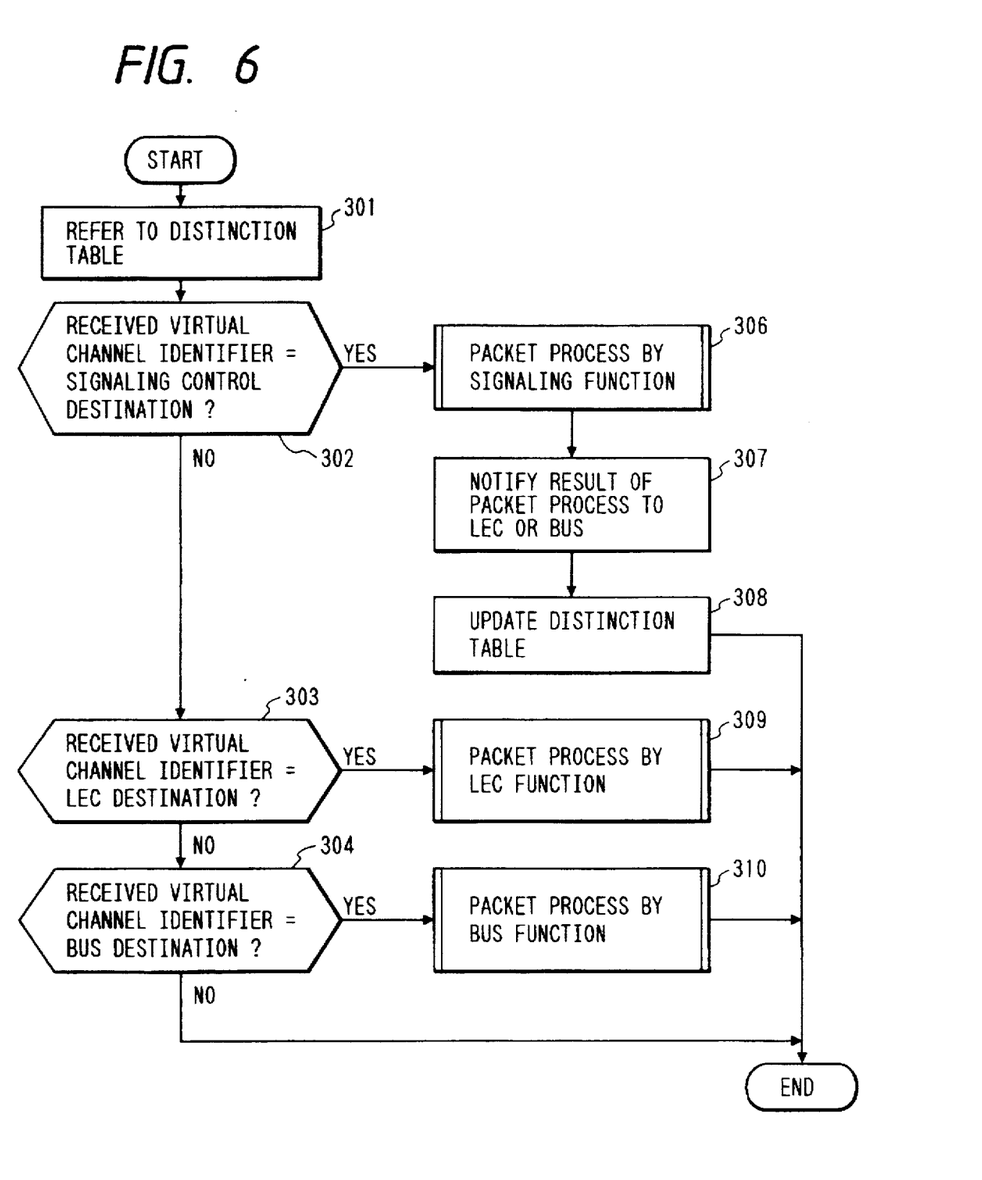
FIG. 6 is a flowchart for centrally describing a process of a packet distinction portion at the time of receipt of a packet.

FIG. 6 is a flowchart for describing the principal operation of the packet distinction function 162 at the time that the packet distinction function 162 has received the corresponding packet from the segmentation and reassembly function 161.

When the packet distinction function 162 receives a packet from the segmentation and reassembly function 161, the packet distinction function 162 refers to the distinction table 167 and makes a decision as to a distinction destination based on the virtual channel identifier notified together with the packet (Step 301). Thereafter, the packet distinction function 162 delivers the corresponding packet to each of the suitable functions, based on the decision (Steps 302, 303 and 304). When the packet distinction destination is judged as being the signaling function 163 from the virtual channel identifier for the received packet, the packet distinction function 162 first delivers the packet to the signaling function 163 (Step 302). The signaling function 163 supplied with the packet processes the corresponding packet in accordance with the procedure defined by the ATM network (Step 306) and notifies the result of processing to either the LEC function 165 or the BUS function 164 (Step 307). Further, the signaling function 163 registers or deletes a virtual channel identifier and a distinction destination into and from the distinction table 167 as needed (Step 308). When the distinction destination for the packet received at Step 302 is found not to be the signaling function 163, the packet distinction function 162 determines or judges whether the packet distinction destination corresponds to the LEC function 165 (Step 303). If the answer is found to be YES at Step 303, then the packet distinction function 162 delivers the packet to the LEC function 165. The LEC function 165 supplied with the packet performs a packet process in accordance with the procedure defined by the ATM Forum (Step 309). When the distinction destination for the packet received at Step 303 is found not to be destined for the LEC function 165, the packet distinction function 162 judges at Step 304 whether the distinction destination corresponds to the BUS function 164. If the packet distinction destination is found to be the BUS function 164 at Step 304, then the packet distinction function 162 delivers the packet to the BUS function 164. The BUS function 164 to which the packet has been delivered, performs a packet process in accordance with the procedure defined by the ATM Forum (Step 310).

A reference is made to FIG. 1 again. The bridging function 166 performs bridging between the ATM LAN 2 and the legacy LAN 3 in accordance with a bridging table created by the bridging/routing management function 115 and distributed through the bus 15. Now consider a case where communications are made between an ATM terminal or ATM LAN end system (not shown) electrically connected to the ATM LAN 2 and a legacy terminal or legacy LAN end system (not shown) electrically connected to the legacy LAN 3, for example. In this case, a virtual channel is first established over the LEC function 165 in the ATM interface with routing/bridging processing function 16 through the ATM LAN end system, whereby communications with the LEC function 165 are temporarily made through the ATM LAN end system. The packet received by the LEC function 165 is delivered to the bridging function 166 where suitable bridging is performed through the bus 15 and the legacy LAN interface with routing/bridging processing function 17.

Further, the communications between the legacy LAN end system electrically connected to the legacy LAN 3 and the ATM LAN end system electrically connected to the ATM LAN 2 are made by allowing the bridging function of the legacy LAN interface with routing/bridging processing function 17 to deliver a packet supplied from the legacy LAN end system to the bridging function 166 through the bus 15 and then allowing the bridging function 166 to deliver the packet to the LEC function.

Figure 7:
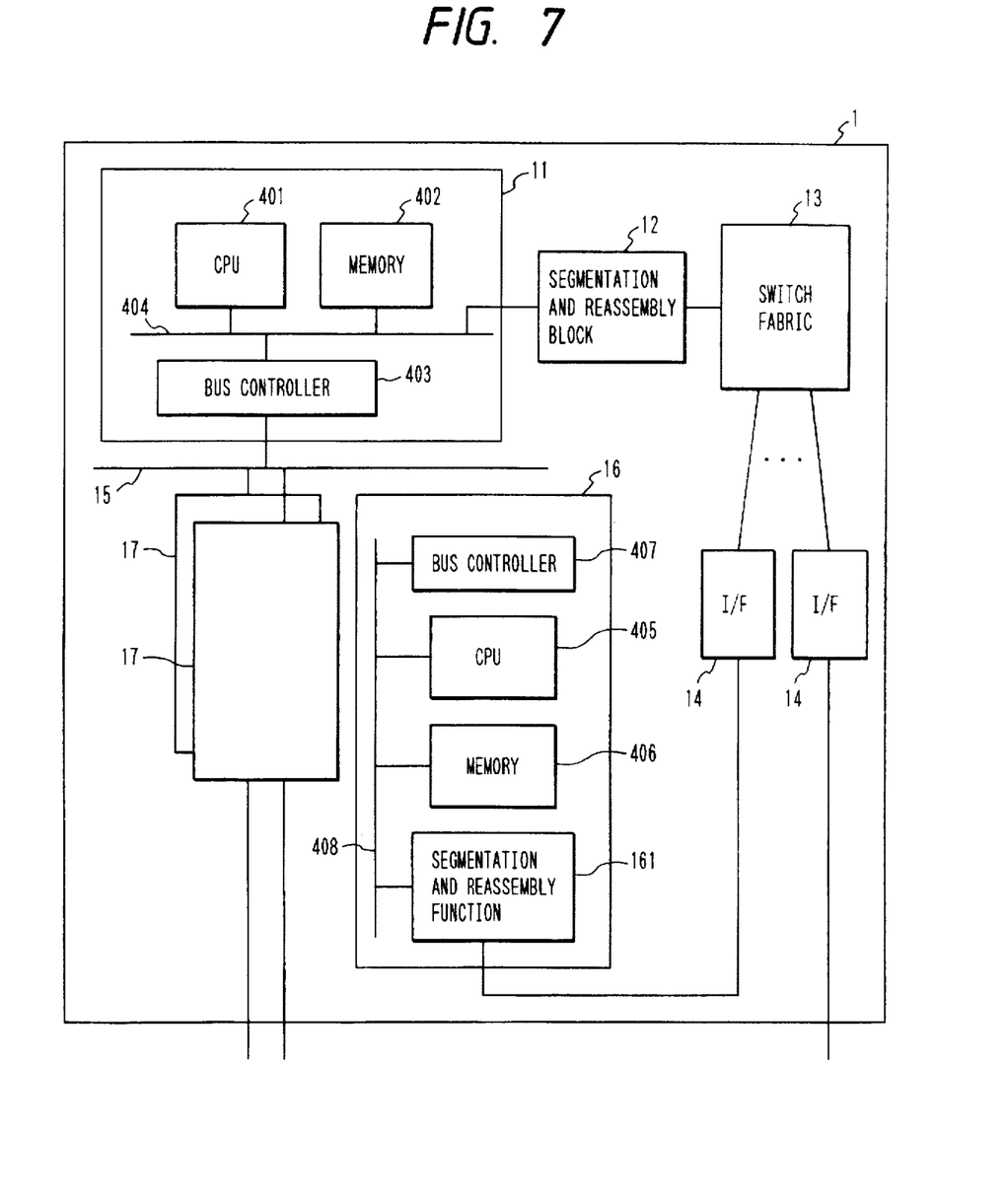
FIG. 7 is a view for describing the configuration of hardware of the ATM switch shown in FIG. 1.

FIG. 7 shows the configuration of hardware employed in the ATM switch according to the present embodiment. The management and control block 11 of the ATM switch 1 comprises a CPU 401, a memory 402, a bus controller 403 and a bus 404 for providing electrical connections between these at a hardware level. The packet distinction function 111, the signaling function 112, the LECS function 113, the LES function 114 and the bridging/routing management function 115 included in the management and control block 11 are realized by software held in the memory 402. Namely, the respective functions are achieved by allowing the CPU 401 to read these pieces of software from the memory 402 through the bus 404 and to execute the read software. The distinction table 116 shows data stored in the memory 402 and is managed by the CPU 401 through the bus 404. A packet on the bus 404 and a packet on the bus 15 are interchanged through the bus controller 403 interposed therebetween. Similarly, the ATM interface with routing/bridging processing function 16 is composed of a CPU 405, a memory 406, a bus controller 407, a segmentation and reassembly function 161 and a bus 408 for providing electrical connections between these. The packet distinction function 162, the signaling function 163, the BUS function 164, the LEC function 165 and the bridging function 166 included in the ATM interface with routing/bridging processing function 16 are realized by software held in the memory 406. Namely, the respective functions are achieved by allowing the CPU 405 to read these pieces of software from the memory 406 through the bus 408 and to execute the read software. The distinction table 167 shows data stored in the memory 406 and is managed by the CPU 405 through the bus 408. A packet on the bus 408 and a packet on the bus 15 are interchanged through the bus controller 407 interposed therebetween.

Figure 8:
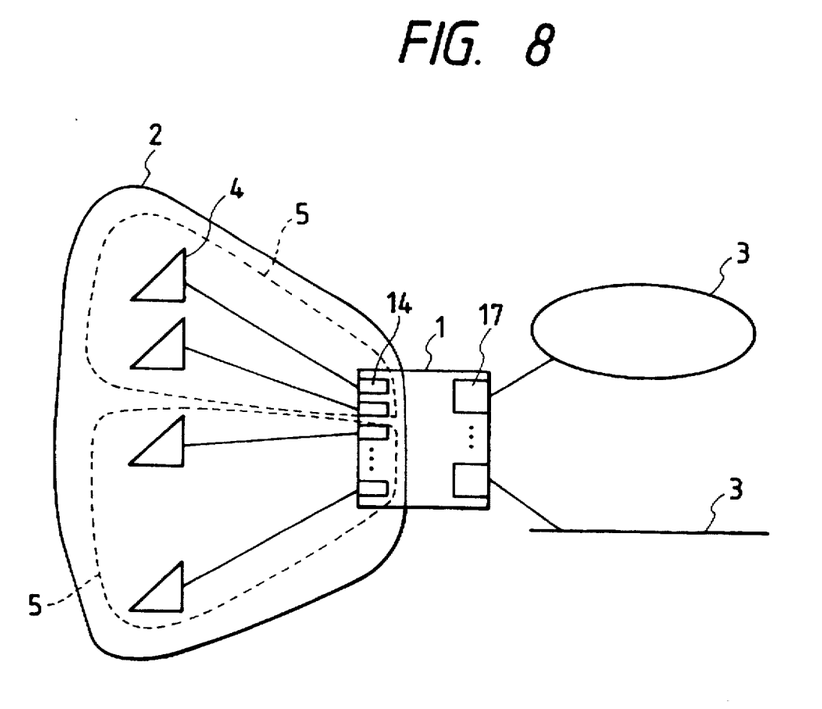
FIG. 8 is a view showing one example of the configuration of a network using the ATM switch having the LAN emulation function, which is shown in FIG. 1.

FIG. 8 shows one example of the configuration of a network using the ATM switch 1 having the LAN emulation function, according to the present embodiment. A plurality of ATM LAN end systems 4 with LEC functions incorporated therein are respectively connected to one another through ATM interfaces 14. Further, a plurality of legacy LANs 3 based on IEE802.5 or IEEE802.3 are respectively interconnected through legacy LAN interface with bridging/routing processing functions 17. A plurality of ELANs (virtual LAN segments) 5 can be formed within the ATM LAN 2 by ELAN management functions placed under the LECS functions 113. The LEC function 165 and the BUS function 164 exist in correspondence to the ELANs. The respective LEC functions 165 relay between the ELANs through the bridging functions 166 respectively.

Figure 9:
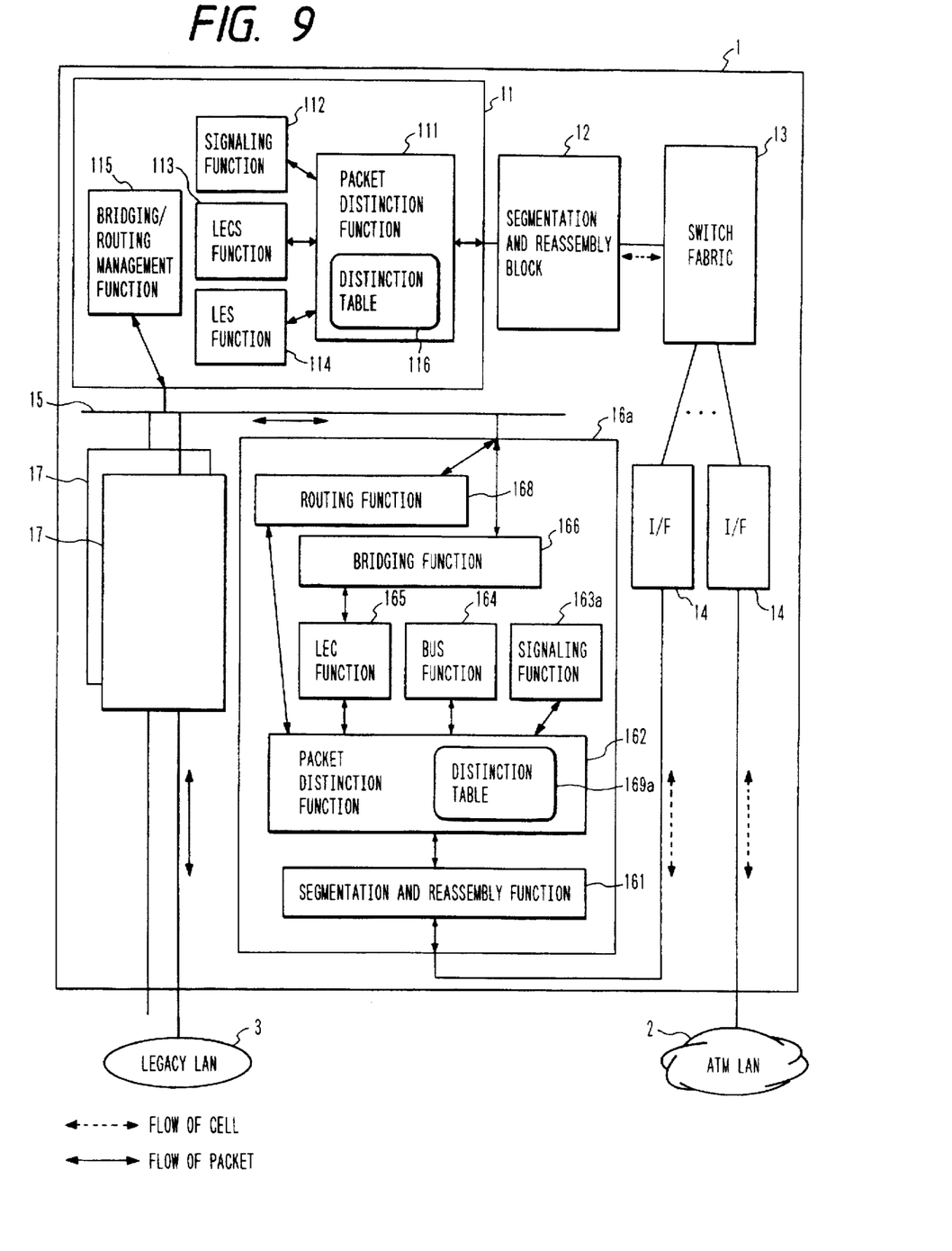
FIG. 9 is a function configurational view of an ATM switch having a LAN emulation function, according to a second embodiment of the present invention.

FIG. 9 illustrates the configuration of an ATM switch having a LAN emulation function, according to a second embodiment of the present invention.

Figure 10:
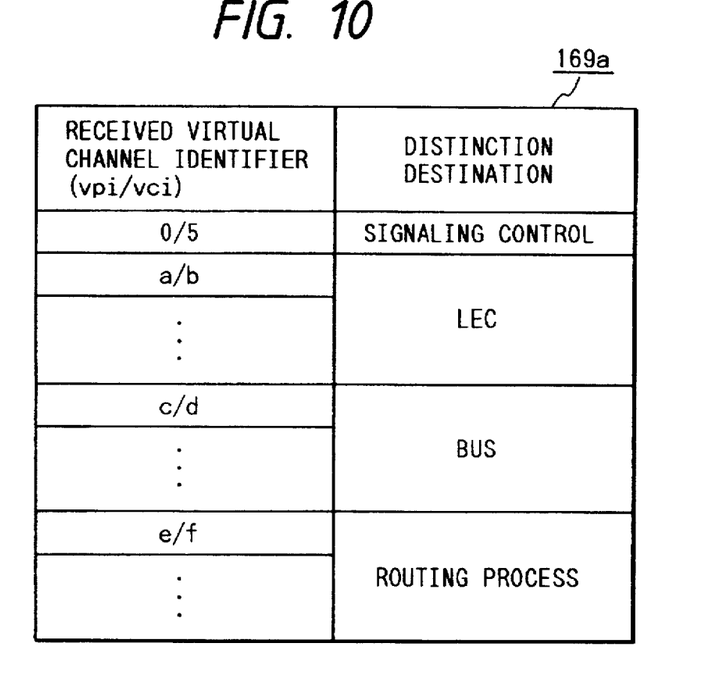
FIG. 10 is a format view illustrating the format of a distinction table.

An ATM interface with bridging/routing processing function of the present embodiment is different in configuration from that of the aforementioned first embodiment. Namely, the ATM interface with bridging/routing processing function 16a employed in the present embodiment has a routing function 168 operated in accordance with the procedure defined by RFC1577 (M. Laubach: Classical IP and ARP over ATM (January, 1994)). Correspondingly, an entry for routing processing is added to a distinction table 169a and a signaling function 163a has a function of updating the entry. FIG. 10 shows the structure of the distinction table 169a. Owing to such a construction, an IP packet based on RFC1577 can be also transmitted through the ATM switch according to the present embodiment.

In the ATM switch and intermediate system described above, the LAN emulation service function composed of the LECS function, the LES function and the BUS function is mounted within each of the ATM switch and the intermediate system. Further, the bridging/routing function is also included therein. It is therefore possible to interconnect between the legacy LAN and the ATM LAN. Thus, the user can realize the LAN emulation by simply preparing the end system or terminal having the LEC function. Namely, a legacy LAN application based on the LAN emulation can be held in the ATM LAN and the interconnection between the legacy LAN and the ATM LAN can be achieved.

Since the LAN emulation service function can be provided in each of the management and control block and the ATM interface with bridging/routing processing function on a distributed basis, load distribution can be performed, thereby making it possible to mount the ATM switch in a suppressed state of its performance degradation.

In the embodiments which have been described above, the LECS function 113 and the LES function 114 are provided in the management and control block 11 and the BUS function 164 is disposed in the ATM interface with bridging/routing processing function 16. However, the present invention is not necessarily limited to such placement. The LECS function 113, the LES function 114 and the BUS function 164 can be disposed on the management and control block 11 and the ATM interface with bridging/routing processing function 16 on a desired combination basis.

Having now fully described the invention, it will be apparent to those skilled in the art that many changes and modifications can be made without departing from the spirit or scope of the invention as set forth herein.

What is claimed is:

1. An ATM switch for providing an interconnection between a connection-oriented ATM LAN of an ATM system and a connectionless legacy LAN, comprising:

a switch fabric electrically connected to said ATM LAN;

a segmentation and reassembly block electrically connected to said switch fabric, for providing an interchange between one of cells transmitted over said ATM LAN and a packet transmitted over said legacy LAN;

a management and control block electrically connected to said switch fabric through said segmentation and reassembly block, for managing and controlling operations for electrical connections between networks;

a first bridging/routing processor having a legacy LAN interface for providing electrical connections between said legacy LAN and said first bridging/routing processor;

a second bridging/routing processor electrically connected to said switch fabric through at least one ATM interface; and a bus for connecting said management and control block, said first bridging/routing processor and said second bridging/routing processor to one another, wherein said management and control block includes a signaling function and a bridging/routing management function for creating a bridging/routing table based on information about configurations of said ATM LAN and said legacy LAN and distributing said created bridging/routing table to said first and second bridging/routing processors, and said second bridging/routing processor includes a bridging function for bridging between said ATM LAN and said legacy LAN in accordance with said bridging/routing table, a signaling function and a LAN emulation client function.

2. An ATM switch according to claim 1, wherein a LAN emulation configuration server function for managing configurations of a plurality of virtual LAN segments on said ATM LAN, a LAN emulation server function for obtaining an address resolution to an ATM address from a media access address, and a broadcast and unknown server function for making a broadcast to a terminal in one of said virtual LAN segments are disposed in said management and control block or said second bridging/routing processor on a distributed basis.

3. An ATM switch according to claim 1, wherein said second bridging/routing processor has a routing function.

4. An ATM switch according to claim 3, wherein said second bridging/routing processor has a packet distinction section for distributing a message inputted from said switch fabric to any of the bridging function, the routing function, the signaling function, the LAN emulation client function, the LAN emulation configuration server function, the LAN emulation server function and the broadcast and unknown server function provided in said second bridging/routing processor.

5. An ATM switch according to claim 2, wherein said management and control block includes a packet distinction section for distributing a packet inputted from said segmentation and reassembly block to either the signaling function or the bridging/routing management function included in said management and control block.

6. An intermediate system comprising:
a switch fabric electrically connected to an ATM LAN corresponding to a connection-oriented network through at least one ATM interface;
a management and control block electrically connected to a first port of said switch fabric through a segmentation and reassembly block and having a signaling function and a bridging management function;
a first bridging processor electrically connected to said management and control block through a bus line, said first bridging processor having a bridging function and an external interface electrically connected with a legacy LAN corresponding to a connectionless network; and
a second bridging processor electrically connected to said management and control block through said bus line, said second bridging processor having a bridging function, a signaling function, a LAN emulation client function and an external interface electrically connected to a second port of said switch fabric through said segmentation and reassembly block;
wherein a LAN emulation configuration server function for managing configurations of a plurality of virtual LAN segments on an ATM LAN called an Emulated LAN, a LAN emulation server function for obtaining an address resolution to an ATM address from a media access address, and a broadcast and unknown server function for making a broadcast to a terminal in one of said virtual LAN segments are provided within each of said management and control block and said second bridging processor on a distributed basis.

7. An intermediate system according to claim 6, wherein said management and control block includes a packet distinction section for distributing a packet inputted from said segmentation and reassembly block to a suitable one of the respective functions included in said management and control block.

8. An intermediate system according to claim 6, wherein said second bridging processor includes a packet distinction section for distributing a message inputted from the second port of said switch fabric to the respective functions included in said second bridging processor.

9. An intermediate system comprising:
a switch fabric electrically connected to an ATM LAN corresponding to a connection-oriented network through at least one ATM interface;
a management and control block electrically connected to a first port of said switch fabric through a segmentation and reassembly block and having a signaling function and a bridging/routing management function;
a first bridging/routing processor electrically connected to said management and control block through a bus line, said first bridging/routing processor having a bridging/routing function and an external interface electrically connected to a legacy LAN corresponding to a connectionless network; and
a second bridging/routing processor electrically connected to said management and control block through said bus line, said second bridging/routing processor having a bridging/routing function, a signaling function, a LAN emulation client function and an external interface electrically connected to a second port of said switch fabric through said segmentation and reassembly block;
wherein a LAN emulation configuration server function for managing configurations of a plurality of virtual LAN segments on an ATM LAN called an Emulated LAN, a LAN emulation server function for obtaining an address resolution to an ATM address from a media access address, and a broadcast and unknown server function for making a broadcast to a terminal in one of said virtual LAN segments are provided within each of said management and control block and said second bridging/routing processor on a distributed basis.

10. An intermediate system according to claim 9, wherein said management and control block includes a packet distinction section for distributing a packet inputted from said segmentation and reassembly block to the LAN emulation configuration server function, the LAN emulation server function and the broadcast and unknown server function included in said management and control block.

11. An intermediate system according to claim 9, wherein said second bridging/routing processor includes a packet distinction section for distributing a message inputted from the second port of said switch fabric to the respective functions included in said second bridging/routing processor.

* * * * *